Patented Apr. 1, 1947

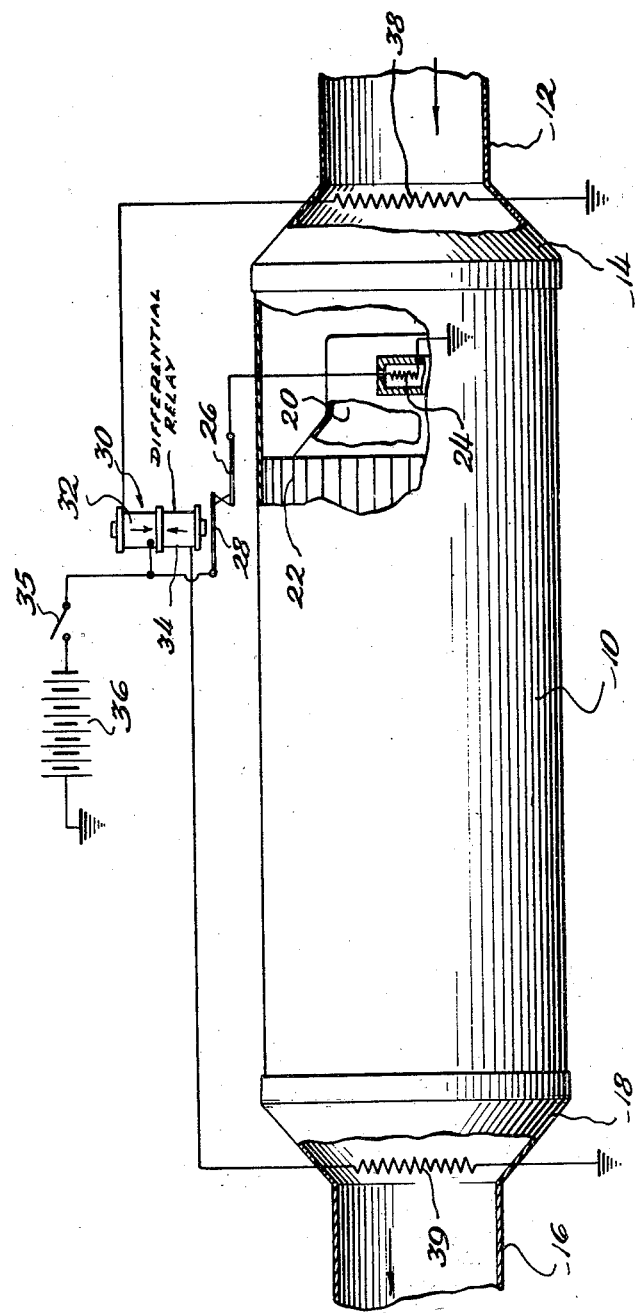

2,418,182

UNITED STATES PATENT OFFICE 2,418,182

AIR HEATER HAVING AIR TEMPERATURE RESPONSIVE IGNITION CONTROL

Henry J. De N. McCollum, Chicago, Ill.; Thelma McCollum, executrix of said Henry J. De N. McCollum, deceased, assignor to Stewart-Warner Corporation, Chicago, Ill., a corporation of Virginia Application October 9, 1944, Serial No. 557,773

4 Claims. (Cl. 126—116)

My invention relates generally to heater controls, and more particularly to improvements in the means for controlling the energization of an electrical igniter forming part of a heater of the sealed combustion type.

In heaters, particularly those of the sealed combustion type utilized for heating aircraft, and in which an electrical igniter is employed, it is desirable to provide a control which effectively deenergizes the igniter as soon as normal combustion takes place. Such control should also cause prompt reenergization of the igniter upon failure of combustion. It has been the practice to control the igniter by means of a temperature responsive switch placed at the ventilating air outlet of the heater and operable, when the ventilating air attains a predetermined temperature, to open the igniter circuit.

Because of the widely different conditions under which an aircraft heater operates, it was found desirable to set the igniter controlling thermostatic switch to operate at a relatively low temperature, and thereby assure that the electrical load of the igniter would be removed as promptly as possible after ignition took place. As a result, the ventilating air was, in normal operation of the heater, raised to a temperature substantially higher than that at which the igniter switch opened. Then upon failure of combustion it took a considerable length of time for the ventilating air temperature to drop sufficiently to permit the thermostatic igniter control switch to reclose. This was particularly the case when the aircraft heater was located in the supply duct of a cabin supercharging system. The compression of the air by the supercharger raises its temperature considerably so that with a normal setting of the thermostatic switch it would open when but a slight amount of heat was added to the already warm air supplied by the supercharger. Thus, when the heaters were used in this manner, the cycling time, that is, the time required for the igniter switch to close after failure of combustion plus the time it took for the heater to restart, was relatively long.

It is therefore the primary object of my invention to provide an improved igniter energization control apparatus for aircraft heaters, in which changes in ambient temperature have no appreciable effect upon the energization and deenergization of the igniter.

A further object is to provide an improved igniter control circuit for aircraft heaters, in which a differential relay is provided for controlling the igniter circuit, the two windings of the relay being supplied with current varying respectively with changes in the temperatures of the ventilating air at the inlet and outlet of the heater.

Other objects will appear from the following description, reference being had to the accompanying drawing which diagrammatically illustrates a heater and its igniter control circuit.

The heater is shown as comprising a casing 10 having an inlet duct 12 connected to the casing by a flaring shroud 14 and a ventilating air outlet duct 16 connected to the casing 10 by a shroud 18. Within the casing 10 is located the combustion chamber 20 of the heater, together with the customary heat exchanger 22. Within the combustion chamber 20 there is located an igniter 24, illustrated conventionally as of the resistance wire type. One terminal of the igniter 24 is grounded, while the other terminal is connected to the lower switch arm 26, which cooperates with the armature 28 of a differential relay 30.

The relay 30 has an upper winding 32 and an opposed lower winding 34, one terminal of each of these windings being connected through a main switch 35 to the ungrounded terminal of a source of electrical energy, illustrated as a battery 36. The other terminal of the upper coil 32 is connected to ground through a temperature responsive resistance element 88. In a similar manner, the other terminal of the lower winding 34 is connected to ground through a temperature responsive resistance element 39.

These resistance elements 38 and 39 are preferably in the form of relatively long wires of a metal or alloy having a high temperature resistance coefficient within the operating temperature range, iron being one suitable metal of which these wires may be made. The average resistance of these wires should be approximately equal to the resistances of the windings 32 and 34. The wires 38 and 39 are preferably shielded against the reception of a radiant heat from the combustion chamber and heat exchanger so that their temperatures will be substantially the same, respectively, as the temperatures of the air entering and leaving the heater.

In normal use of the apparatus, the duct 12 may be supplied with air from a ram or blower, but the invention is of particular utility when this duct is connected to a supercharger and the air supplied is thus heated due to its compression.

It will be noted that there are two parallel circuits continuously supplied with energy, while the main switch 35 is closed, the one through winding 32 and resistance 38, and the other through winding 34 and resistance 39. As long as the outlet temperature is not appreciably higher than the temperature of the air entering the heater, the flow through these two circuits will be equal, or at least produce equal and opposed magnetizing effects through the core of the relay 30. However, when the resistance 39 is heated to a temperature higher than that of the resistance 38 by a predetermined amount, as will be the case when the heater is in normal operation, the current flow through the winding 32 will be greater than through the winding 34, and the differential of the magnetization effects of the current flow through these windings will result in opening the switches 26, 28, thereby deenergizing the igniter 24. The igniter will remain deenergized as long as the temperature of the ventilating air leaving the heater exceeds that of the air entering the heater to the predetermined extent, irrespective of changes in the temperature of the entering air. The control apparatus thus performs the useful function of deenergizing the igniter promptly after the heater commences operation, and reenergizing the igniter promptly after the heater flame is accidentally extinguished, without being affected by changes in ambient temperature. Within the temperature ranges encountered in practice, the temperature resistance coefficient of the resistance elements 38, 39 may vary substantially directly with the temperature. The deviations from straight line variation can be made very small by proper selection of the metal or alloy employed for the resistance wires 38, 39.

While I have shown and described a particular embodiment of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. In an air heater having a combustion chamber, heat exchanger, and an electrical igniter for igniting fuel supplied to the combustion chamber; the combination of a differential relay having two opposed windings and having a switch which is opened when the current through either of said windings substantially exceeds that through the other winding, an igniter circuit including said relay switch, a source of electrical energy included in said igniter circuit, a pair of electrical resistances responsive, respectively, to the temperature of the ventilating air at the inlet of said heat exchanger and to the temperature of the ventilating air at the outlet of said heat exchanger, and similar circuits connecting said resistances respectively in series with said relay windings and in series with said source.

2. In an air heater having an electrical igniter, the combination of a differential relay having a pair of windings, a circuit controlled by said relay and adapted to supply energizing current for the igniter, a source of electrical energy, and a pair of resistance elements located respectively at the air inlet and air outlet of the heater and having a high temperature resistance coefficient, said resistance elements being connected in circuit with said source and in circuit, respectively, with the windings of said differential relay, said resistance elements being of such values that when they are at the same temperature the magnetic flux fields produced by their connected windings will be of opposite polarity and of substantially equal density, thereby to cause said relay to deenergize said igniter when greater than a predetermined difference exists between the temperature at the outlet and the temperature at the inlet of the heater.

3. In an aircraft heater embodying means forming a combustion chamber, and a heat exchanger adapted to be supplied with ventilating air the temperature of which is subject to substantial variation, the combination of an electrical igniter located in the combustion chamber, a source of energy for said igniter, means including a differential relay having two opposed windings and operable to connect said igniter to said source whenever the current flow through the two windings is substantially equal, and circuits including means respectively at the ventilating air inlet and outlet of said heater and responsive to the temperature of the ventilating air to control the current flow through said windings, respectively.

4. In an aircraft heater embodying means forming a combustion chamber, and a heat exchanger adapted to be supplied with ventilating air the temperature of which is subject to substantial variation, the combination of an electrical igniter located in the combustion chamber, a source of energy for said igniter, resistance elements having high temperature resistance coefficients and located respectively at the ventilating air inlet and outlet of said heater so as to be responsive to the temperature of the ventilating air, and means responsive to changes in the relation resistances of said resistance elements to control the connection of said igniter to said source.

HENRY J. DE N. McCOLLUM.

REFERENCES CITED

The following references are of record in the file of this patent:

UNITED STATES PATENTS

| Number | Name | Date |
|---|---|---|
| 2,196,170 | Nessell | Apr. 9, 1940 |
| 2,386,807 | Leslie | Oct. 16, 1945 |